US009959522B2

(12) United States Patent
Kenna, III et al.

(10) Patent No.: US 9,959,522 B2
(45) Date of Patent: May 1, 2018

(54) SYSTEM AND METHOD FOR CONTROLLING THE DISTRIBUTION OF ELECTRONIC MEDIA

(75) Inventors: Frank Kenna, III, Bradford, CT (US); Preeti Patel, Norwalk, CT (US)

(73) Assignee: THE MARLIN COMPANY, Wallingford, CT (US)

(*) Notice: Subject to any disclaimer, the term of this patent is extended or adjusted under 35 U.S.C. 154(b) by 0 days. days.

(21) Appl. No.: 13/352,179

(22) Filed: Jan. 17, 2012

(65) Prior Publication Data

US 2013/0185666 A1    Jul. 18, 2013

(51) Int. Cl.
| | |
|---|---|
| *G06Q 10/10* | (2012.01) |
| *H04L 29/06* | (2006.01) |
| *H04L 29/08* | (2006.01) |
| *G06F 21/10* | (2013.01) |

(52) U.S. Cl.
CPC ............ *G06Q 10/10* (2013.01); *G06F 21/10* (2013.01); *H04L 63/08* (2013.01); *H04L 63/104* (2013.01); *H04L 67/06* (2013.01)

(58) Field of Classification Search
CPC ....... H04L 63/08; H04L 63/104; H04L 67/06; G06F 21/10; G06Q 10/10
USPC ......................................... 715/769, 713, 855
See application file for complete search history.

(56) References Cited

U.S. PATENT DOCUMENTS

| | | | | |
|---|---|---|---|---|
| 7,287,180 B1* | 10/2007 | Chen et al. | ..................... | 714/4.3 |
| 7,315,985 B1* | 1/2008 | Gauvin et al. | ................ | 715/734 |
| 7,743,112 B2 | 6/2010 | Kenna, III et al. | | |
| 7,765,273 B2 | 7/2010 | Kenna, III et al. | | |
| 8,365,094 B2* | 1/2013 | Sato et al. | ..................... | 715/810 |
| 2002/0054172 A1* | 5/2002 | Berman et al. | ................ | 345/856 |
| 2002/0113822 A1* | 8/2002 | Windl | ................... | G06F 3/0483 715/769 |
| 2002/0143775 A1* | 10/2002 | Wilkinson et al. | ............. | 707/10 |
| 2003/0008661 A1* | 1/2003 | Joyce et al. | ................... | 455/456 |
| 2003/0065763 A1* | 4/2003 | Swildens et al. | ............. | 709/224 |
| 2003/0162159 A1* | 8/2003 | Sheehan | ....................... | 434/362 |
| 2004/0230917 A1* | 11/2004 | Bales et al. | .................... | 715/854 |
| 2005/0060647 A1* | 3/2005 | Doan et al. | .................... | 715/514 |
| 2005/0246352 A1* | 11/2005 | Moore | ............. | G06F 17/30067 |
| 2006/0107218 A1* | 5/2006 | Clark et al. | .................... | 715/733 |
| 2006/0167908 A1* | 7/2006 | Roemke | ............. | G06F 17/3089 |
| 2006/0286536 A1* | 12/2006 | Mohler et al. | ................ | 434/350 |
| 2007/0198930 A1* | 8/2007 | Chu et al. | ..................... | 715/713 |

(Continued)

OTHER PUBLICATIONS

Yang et al., "InterRing: An Interactive Tool for Visually Navigating and Manipulating Hierarchical Structures", 2002, IEEE Symposium on Information Visualization, pp. 1-8.*

*Primary Examiner* — Nicholas Klicos
(74) *Attorney, Agent, or Firm* — Cantor Colburn LLP

(57) ABSTRACT

Distribution of media data to multiple displays is managed by displaying a representation of the access relationships among users, administrators, data, and the displays in the form of a hierarchical tree diagram or corporate organizational chart. The representation can be organized as a number of linked data objects having specific levels of hierarchy, each data object expressing data distribution and access control relationships which are at least partly determined implicitly by their position within the hierarchy. By interacting graphically with the tree, a user can quickly and efficiently manage the distribution of data and the administrative access relationships among displays.

18 Claims, 14 Drawing Sheets

(56) References Cited

U.S. PATENT DOCUMENTS

| | | | |
|---|---|---|---|
| 2007/0245257 A1* | 10/2007 | Chan et al. | 715/769 |
| 2007/0266321 A1* | 11/2007 | Bicker et al. | 715/713 |
| 2008/0005349 A1* | 1/2008 | Li et al. | 709/231 |
| 2008/0052623 A1* | 2/2008 | Gutfleisch | 715/713 |
| 2008/0077530 A1* | 3/2008 | Banas et al. | 705/50 |
| 2008/0115167 A1* | 5/2008 | Hermsmeyer et al. | 725/46 |
| 2008/0147866 A1* | 6/2008 | Stolorz et al. | 709/226 |
| 2008/0194272 A1* | 8/2008 | Smith et al. | 455/456.3 |
| 2008/0219158 A1* | 9/2008 | Mukraj | H04L 67/2814 370/230 |
| 2009/0100339 A1* | 4/2009 | Wharton-Ali et al. | 715/720 |
| 2009/0113331 A1* | 4/2009 | Smith | G06F 8/34 715/769 |
| 2009/0190505 A1* | 7/2009 | Gassewitz et al. | 370/259 |
| 2009/0222870 A1* | 9/2009 | Gruber et al. | 725/109 |
| 2010/0058214 A1* | 3/2010 | Singh | G06F 3/0486 715/769 |
| 2010/0162364 A1* | 6/2010 | Roth | G06F 21/604 726/4 |
| 2010/0175010 A1* | 7/2010 | Jeyabalan et al. | 715/769 |
| 2010/0175017 A1 | 7/2010 | Kenna, III et al. | |
| 2010/0250723 A1* | 9/2010 | Kamei | 709/223 |
| 2010/0279665 A1* | 11/2010 | Hardin et al. | 455/414.1 |
| 2010/0306195 A1* | 12/2010 | Wagener et al. | 707/736 |
| 2010/0318516 A1* | 12/2010 | Kolen et al. | 707/736 |
| 2010/0324983 A1* | 12/2010 | Etchegoyen | 705/14.23 |
| 2011/0055767 A1* | 3/2011 | Chen et al. | 715/841 |
| 2011/0077026 A1* | 3/2011 | Cousins et al. | 455/456.2 |
| 2011/0125847 A1* | 5/2011 | Cocheu et al. | 709/204 |
| 2011/0154234 A1* | 6/2011 | Winternitz et al. | 715/765 |
| 2011/0219433 A1* | 9/2011 | Albrecht-Buehler | 726/4 |
| 2011/0299427 A1* | 12/2011 | Chu et al. | 370/256 |
| 2011/0320943 A1* | 12/2011 | Wade et al. | 715/708 |
| 2012/0054302 A1* | 3/2012 | Priyadarshan et al. | 709/217 |
| 2012/0190002 A1* | 7/2012 | Payne et al. | 434/365 |
| 2012/0240194 A1* | 9/2012 | Nack Ngue | 726/4 |
| 2013/0110795 A1* | 5/2013 | DeRose | G06F 17/3089 707/694 |

\* cited by examiner

SYSTEM AND METHOD FOR CONTROLLING THE DISTRIBUTION OF ELECTRONIC MEDIA

FIELD OF THE INVENTION

The present invention relates generally to communication programs, and, more particularly, to a method and apparatus for controlling the distribution of electronic media communications.

BACKGROUND OF THE INVENTION

Modern business management calls for effective communications between management and employees. Among various other techniques for communicating with employees, conventional employee communication programs have typically included providing a bulletin board upon which printed material, such as for example, posters including photographs, artwork, designs and/or slogans, and messages are displayed. Topics that may be the subject of employee communications are diverse and may involve safety, work quality, teamwork, morale and self-motivation. For example, since safety is an important consideration in most working environments, a poster with a slogan relating to the exercise of caution in potentially dangerous situations may be displayed for impressing upon employees an employer's requirement for observing on-the-job safety. Other examples of representative employee communications include news releases about the company, messages for boosting employee morale and/or messages relating to employee activities.

In conventional systems, graphic designers may develop posters and other employee communications by hand or on a computer aided design system. Typically, they are printed as a large employee communication for display and then sent to a client for mounting to a bulletin board. The bulletin board may be relatively sophisticated and creatively organized for efficiency and visual attention, such as a three-panel bulletin board on the order of 26 inches (66 centimeters) by 63 inches (160 centimeters). The posters are typically manually replaced to communicate corporate goals, news of interest and employee activities to employees.

At regular time intervals, such as once a month or once a week, clients may select new posters and messages and/or the new posters and messages are automatically selected, printed and shipped periodically to each client. Because of the large number and variety of clients and the specific requirements for certain users, there are significant inefficiencies associated with selecting, printing and shipping the employee communications. This is especially so where various bulletin boards located throughout a company's various facilities require different material to be posted on differing bulletin boards.

In addition, achieving a relatively high degree of customization and selectivity with traditional manual bulletin board systems is economically problematic.

Recently, the display of printed employee communications have begun to be supplanted by the distribution of electronic media, where the electronic media replaces the physical posters and printed materials and the conventional bulletin board is replaced by an electronic display. Maintaining the employee communications in electronic form from creation to display significantly reduces costs, while at the same time, dramatically improving the flexibility of an employee communications program.

A known system for the distribution of such electronic media is disclosed by U.S. Pat. No. 7,765,273, to Kenna, III et al., which describes replacing the display of printed employee communications with a method and apparatus for distribution of electronic media. In a typical embodiment of the invention, electronic media replaces the posters and printed materials and the conventional bulletin board is replaced by an electronic display. Maintaining the employee communications in electronic form from creation to display significantly reduces cost while dramatically improving the flexibility of an employee communications program. In particular, collections of electronic media are created or generated from pre-assembled media content from a provider, where different collections are transmitted to different displays at separate remote subscriber locations.

Other known systems for the distribution of such electronic media is disclosed by U.S. Pat. No. 7,743,112 and US Patent Publication No. 2010/0175017, both to Kenna, III et al., which describe an electronic display for displaying selected electronic media content that may be selected, modified and/or generated by a subscriber. The systems allow for dramatically increased subscriber control of the media content presented as well as for increased security for any confidential media content to be presented on the customer display. The systems further provide for individual control of multiple displays that may be located in differing geographic locations while at the same time providing for ease of information management.

However, in an organization having several locations, each location requiring different information to be displayed, managing content and content distribution becomes a formidable logistical challenge. For example, where employee communications are used to display information related to local weather, traffic, and safety, it can be difficult to orchestrate reprogramming of the media data for the specific needs of each location on an as needed basis. However, in emergent circumstances such as a weather emergency or natural disaster, it can be vital to provide location specific information in a timely way under conditions of confusion. Even in more mundane circumstances, where general announcements are to be posted announcing the visit of a VIP guest to a specific location, or a holiday celebrated at certain locations within a given country, it would be advantageous to update the relevant information in a robust, efficient, and reliable way.

What is desired therefore is a system and method for controlling the distribution of electronic media that addresses these deficiencies, providing maximum versatility and ease of use.

SUMMARY OF THE INVENTION

As used in this application, the term "deliver" shall be understood to encompass transmitting, downloading and uploading, or any combination thereof.

The term "network" as used herein includes both networks and internetworks of all kinds, including the Internet, and is not limited to any particular network or inter-network.

The term "media data" as used herein means data distributed on storage media, or otherwise, without regard to the form or content thereof, and including but not limited to audio, video, text, images, animations, web pages and streaming media data.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The term "computer" as used herein means a computer which comprises at least one processor and may be any commercially available computing device such as those manufactured and marketed by the Compaq Corporation or may be or include, for instance, any personal computer running the Microsoft Windows® 95, 98, 2000 or later version, Millenium®, NT®, Windows CE®, Palm® OS, Unix®, Linux®, Solaris®, OS/2®, BeOS®, MacOS® or other operating system or platform. The computer may also be or include any microprocessor-based machine such as an Intel® x86-based device or Motorola 68K or PowerPC device, microcontroller or other general or special purpose device operating under programmed control.

A system for controlling delivery of display information to one or more displays over a network, the system comprising a GUI coupled to a computer; the computer executing software controlling delivery of display information to the one or more displays; the software presenting a hierarchical tree structure on the GUI having data objects associated with control of delivery of display information to one or more displays under a particular data object; wherein each data object is represented by an icon; wherein display information are assigned to each display according to the position of the data objects within the hierarchy.

It is another object of the invention to provide a system wherein the hierarchical tree structure is modifiable.

It is another object of the invention to provide a system wherein displays are assigned to one or more data objects;

It is another object of the invention to provide a system wherein display information delivered to each display is modifiable only by the administrators or users assigned to data objects superior to the display in the hierarchical tree structure.

It is another object of the invention to provide a system wherein users assigned to each data object are modifiable only by administrators assigned to that data object or to data objects at a higher level in the hierarchical tree structure.

It is another object of the invention to provide a system wherein each icon represents more than one display.

It is another object of the invention to provide a system wherein display information are assigned to one or more data objects.

It is another object of the invention to provide a system wherein the hierarchical tree structure is modified using a drag-drop procedure.

It is another object of the invention to provide a system modifying the hierarchical tree structure reassigns display information, to one or more data objects.

It is another object of the invention to provide a system wherein modifying the hierarchical tree structure alters the distribution of display information to one or more locations.

It is another object of the invention to provide a system wherein each icon includes buttons which allow access to view, assign, or modify users for displays associated with the data object represented by the icon, view, assign, or modify display information for displays associated with the data object represented by the icon, or to delete the icon and the data object represented by the icon from the tree.

It is another object of the invention to provide a system wherein viewing, assigning or modifying users for locations associated with the icon or display information for subscriber displays associated with the icon is performed using a selection window, dialog, or menu.

It is another object of the invention to provide a system wherein dragging an icon includes all icons lower in the tree.

It is another object of the invention to provide a system wherein dragging an icon causes all icons lower in the tree to be reassigned.

It is another object of the invention to provide a system wherein one or more servers coupled to the network deliver display information to the displays over the network.

It is another object of the invention to provide a system wherein users assigned to each data object have permission to assign, or modify the display information associated with that data object, or for data objects at a lower level in the hierarchy.

It is an object of the invention to provide a method of controlling delivery of display information to one or more displays over a network, the method comprising providing a GUI coupled to a computer; executing software on the computer controlling delivery of display information to the one or more displays; presenting a hierarchical tree structure on the GUI having data objects associated with control of delivery of display information to one or more displays under a particular data object; representing each data object in the hierarchical tree structure by an icon; relating display information to each display according to the position of the data objects within the hierarchy.

It is another object of the invention to provide a method wherein the GUI comprises one or more of a computer, a laptop, a smart phone, or a touch screen device.

It is another object of the invention to provide a method wherein wherein functions of the GUI are accessible to one or more administrators or users.

It is another object of the invention to provide a method wherein access by an administrator or user to functions of the GUI is limited based upon the data objects to which they are assigned and the by the positions of these data objects within the hierarchy.

It is another object of the invention to provide a method wherein display information comprises electronic media data selected from the group consisting of: audio, video, text, images, animations, web pages, streaming media data and combinations thereof.

It is another object of the invention to provide a method wherein a user assigned to a display sets a sequential order and time limit for display information to be displayed on the display.

DETAILED DESCRIPTION OF THE INVENTION

Figure 1:
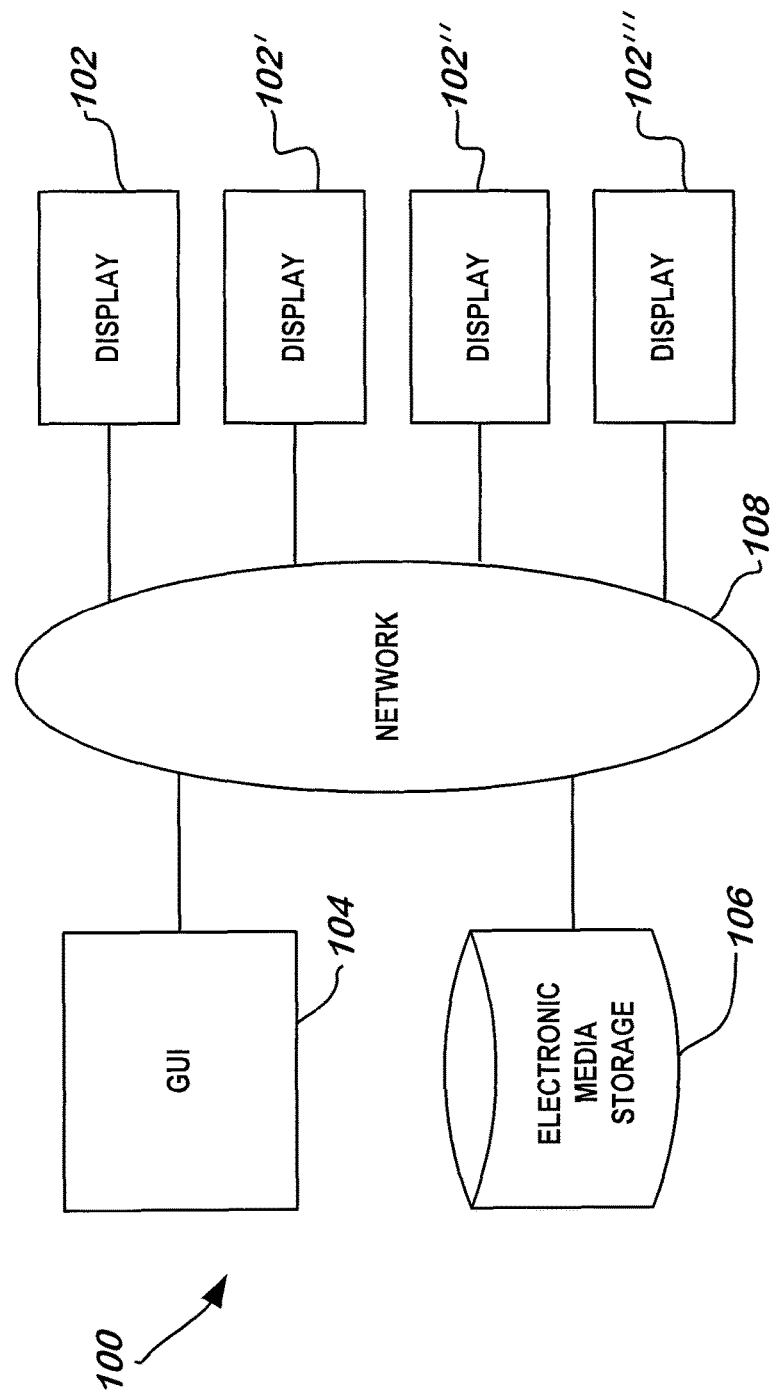
FIG. 1 is a block diagram illustrating an example system incorporating elements of the invention.

FIG. 1 is a block diagram illustrating an example system 100 incorporating elements of the invention.

Multiple display systems 102, 102', 102", 102"', GUI 104, and electronic media storage 106 are coupled to network 108.

Electronic media storage 106 contains media data, which may be arranged into collections or electronic poster kits (not shown). A function of system 100 is to selectively deliver some or all media data from electronic media storage 106 to some or all display systems 102, 102', 102", 102"' for display.

Network 106 may comprise, for example, any one or more of the following: the Internet, an intranet, a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or EI line, Digital Data Service (DDS) connection, DSL (Digital Subscriber Line) connection, an Ethernet connection, an ATM (Asynchronous Transfer Mode) connection, FDDI (Fiber Distributed Data Interface), CDDI (Copper Distributed Data Interface) connections, or other known arrangements for creating a data link between computers and/or other devices associated with computer hardware.

Multiple display systems 102, 102', 102", 102"' may each be optionally located at a site remote from the GUI 104, each having one or more remote subscriber display systems 108, 108', 108". Each display system 102, 102', 102", 102"' may be a standalone unit or kiosk which may in an example configuration comprise a display screen (not shown) controlled by a hardware controller (not shown) capable of receiving media data and causing it to be presented on the display screen. Optionally, each display system 102, 102', 102", 102"' may comprise a personal computer or other computing device that is coupled with and controls a display screen (not shown).

Electronic media storage 106 can be any known type of hardware storage device, including arrangements of hard drives which may be coupled to a computing device (not shown), or may comprise cloud resources accessible over the internet, for example. Electronic media storage 106 can be in communication either directly or over network 108 with the display systems 102, 102', 102", 102"'. Electronic media storage 106 contains various media data content (not shown) such as audio, video, text, images, animations, web pages, streaming media data, collections of media data, or electronic poster kits, for display on display systems 102, 102', 102", 102"'.

Graphical User Interface (GUI) 112 comprises software executing on a computer or another device (not shown) which is in communication with the network 108, and operates to enable an administrator to control the distribution of media data (not shown) from the electronic media storage 106 to display systems 102, 102', 102", 102"'.

Figure 2:
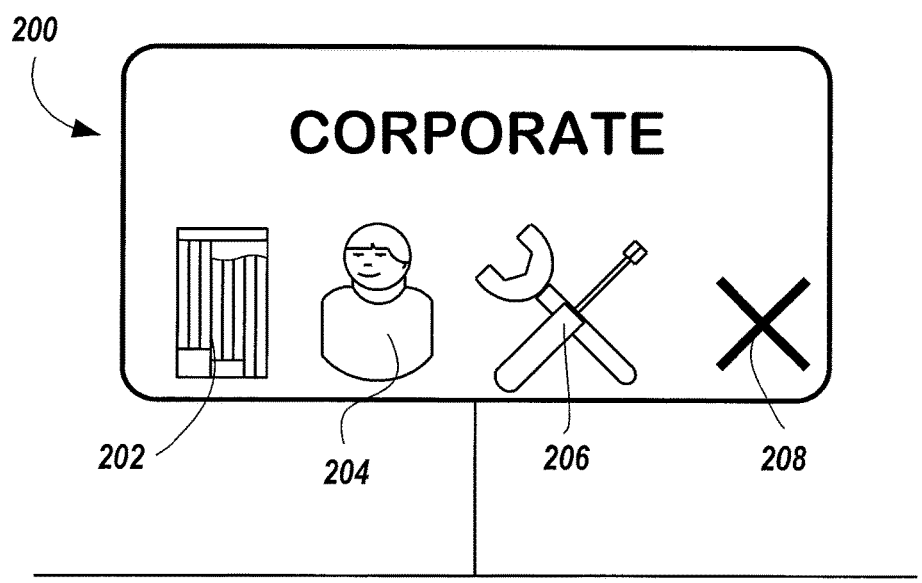
FIG. 2 is a view showing an example of an icon representing a data object according to aspects of the invention.

FIG. 2 shows an example of an icon 200, as displayed using GUI 112 (FIG. 1). Icon 200 is an abstraction which may be representative of one of the display systems 102, 102', 102", 102"', a subset of one or more display systems 102, 102', 102", 102"', display systems 102, 102', 102", 102"' at several discrete locations, or any other organizational groupings of a network of remote subscriber displays. Icon 200 may also represent a data object within a hierarchical organization of the relationships among users, administrators, and displays (not shown). Using GUI 112 (FIG. 1), an administrator can interact with control information (not shown) associated with icon 200 using various controls 202, 204, 206, 208 associated with or incorporated into icon 200. For example, a control 202 can be used to access the functionality of the data object associated with icon 200. A user control 204 may be used to access a user selection dialog (not shown) whereby various users can be assigned to the data object associated with icon 200. A configuration control 206 may be used to access a configuration dialog (not shown) whereby various arrangements of content (not shown) from electronic media storage 110 can be assembled, selected, modified, updated, assigned, transferred, or otherwise managed as a "kit". A delete control 208 can be used to remove a data object represented by icon 200 from a hierarchy (not shown).

Figure 3:
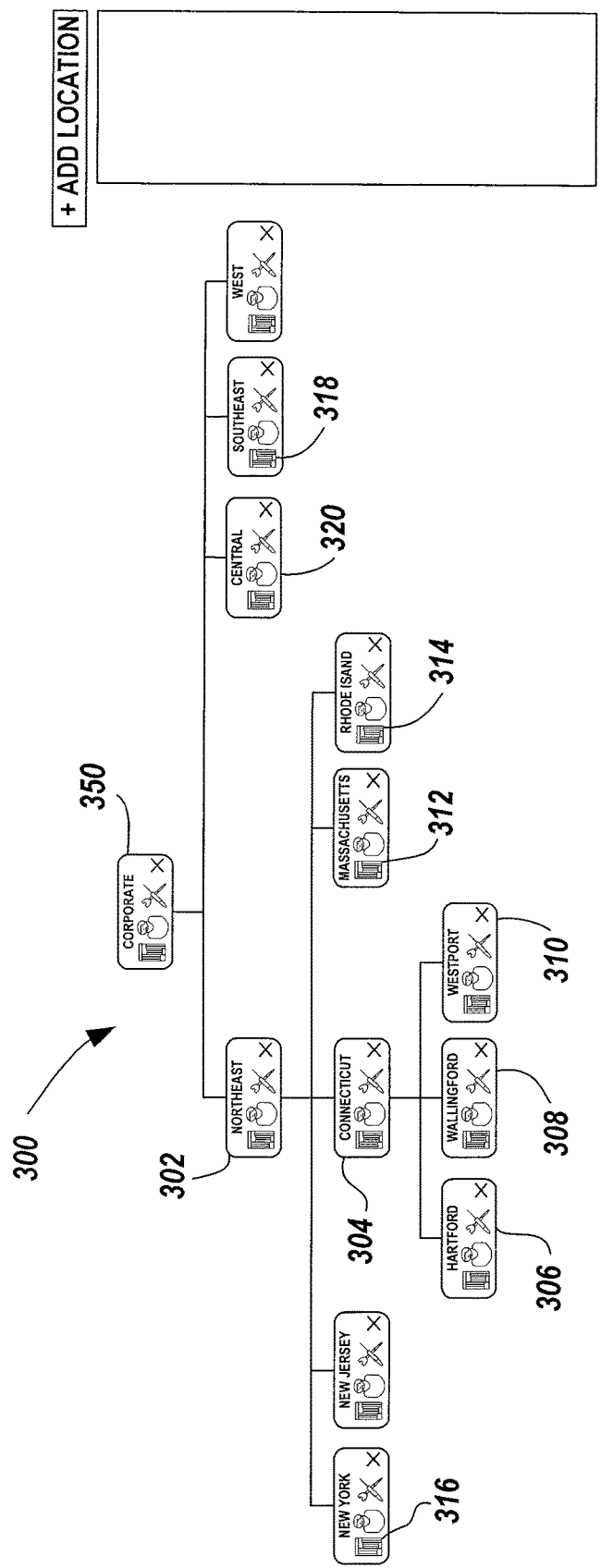
FIG. 3 is a view showing an example of a hierarchical graphical representation expressing administrative relationships.

FIG. 3 shows an example of a hierarchical graphical representation 300 expressing relationships or other relationships among users, administrators, and displays. These relationships can include access to control content shown on displays associated with a given data object, and control over user access to control content for that data object, or for subordinate data objects. Optionally, these relationships can include other relationships among users, administrators, and displays. Representation 300 has the general form of a hierarchical tree diagram or corporate organizational chart and contains graphical representations of one or more data objects, similar to icon 200 (FIG. 2). These data objects may be organized as linked data objects having specific levels of hierarchy. Representation 300 graphically expresses relationships among users and administrators of the system 100 (FIG. 1). For example, representation 300 may contain a Corporate data object 350, a Northeast data object 302, a Connecticut data object 304, a Hartford data object 306, a Wallingford data object 308, and a Westport data object 310. Corporate data object 350 is the root data object of the hierarchy. Connecticut data object 304 is an intermediate data object, while Hartford 306, Wallingford 308, and Westport 310 are terminal data objects. Optionally, the terminal data objects in the hierarchy each may represent a location and all displays at the location, a subset of one or more displays at that location, displays at multiple locations controlled by administrators related to that location, displays at several discrete locations, or any other organizational groupings of a network of remote subscriber displays. Users assigned to a terminal data object may be permitted to access and modify various configuration information relating specifically to the display screens associated with that data object.

For example, users assigned to the Wallingford data object 308 can access a configuration dialog (not shown) for that data object in order to assemble, select, modify, or update content shown on displays at the associated location. However, a user assigned only to the Wallingford data object would ordinarily not be able to access a configuration or any other dialog for data objects in the hierarchy. In this case, a user assigned to Wallingford data object 308 would ordinarily not be able to access any configuration dialogs for the Northeast 302 or Corporate 350 data objects.

Intermediate data objects and the Root data object, in contrast, optionally represent a collection of the displays represented by all terminal data objects subordinate to their position in the hierarchy, or a subset of these. For example, users assigned to the Connecticut data object 304 can access a configuration dialog (not shown) for that data object in order to assemble, select, modify, or update content shown on displays associated with data objects subordinate to that data object. Users assigned to the Connecticut data object 304 may also access a configuration dialog (not shown) for specific data objects that are subordinate to the Connecticut data object 304 in the hierarchy. For example, a user at the Connecticut data object would be permitted to access a configuration dialog to manage content for displays associated with the Hartford 306, Wallingford 308, and Westport 310 data objects. However, a user at the Connecticut data object would ordinarily not be able to access a configuration or any other dialog for data objects above the Connecticut data object 304 in the hierarchy. In this case, a user at the Connecticut data object would ordinarily not be able to access any configuration dialogs for the Northeast 302 or Corporate 350 data objects. Similarly, users at the Connecticut data object 304 would ordinarily not be permitted to access configuration dialogs for data objects on separate branches of the hierarchy; e.g., the Massachusetts 312 or Rhode Island 314 data objects.

Users assigned to a particular data object can also "push" (i.e. assign) media data down to multiple data objects or entire branches of the tree at lower levels in the hierarchy. For example, a user with access to the Northeast data object could push content to the Connecticut data object 304, Hartford data object 306, Wallingford data object 308, and Westport data object 310 simultaneously, and optionally, to the New York data object 316. Similarly, users with access to the Corporate data object 350 could push content to the Northeast data object 302, and so on down the tree.

In addition to expressing administrative relationships among the relationships among users, administrators, and displays, the GUI also enables administrators with appropriate levels of authority to easily modify and configure these relationships by interacting with the tree.

Figure 4:
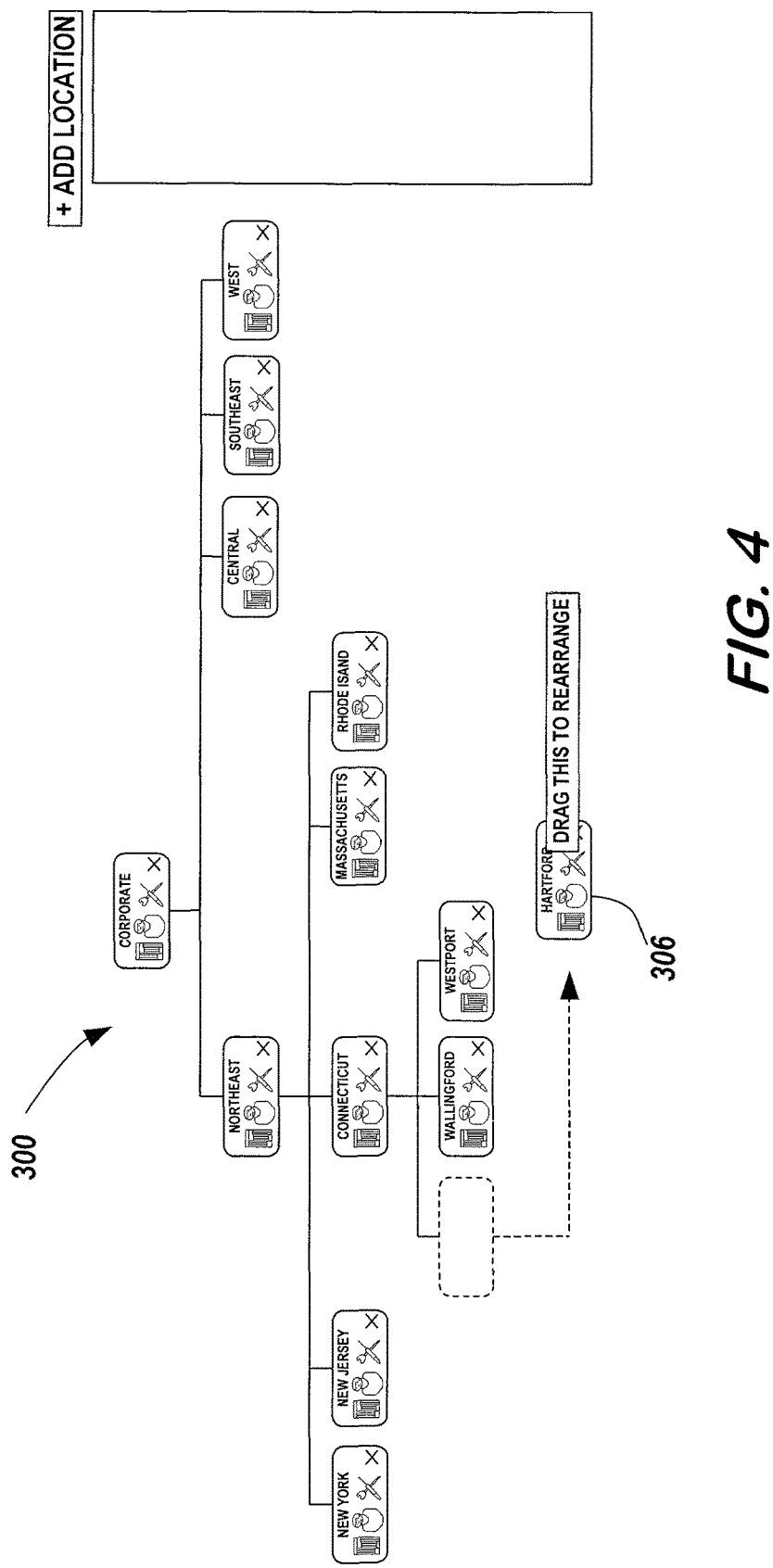
FIG. 4 is a view illustrating an example drag-drop interaction according to aspects of the invention.

FIG. 4 illustrates an example drag-drop interaction with representation 300 according to aspects of the invention. In this example, a user having administrative access to the Hartford data object 306 (e.g. users assigned to Hartford or above in the hierarchy) can move this data object within the hierarchy using a standard click-drag operation with a pointing device such as a mouse. This data object can subsequently be "dropped" (e.g. by releasing a mouse button) in a region of the tree proximate to another data object. Optionally, the representation of the Hartford data object 306 can "snap" into place within representation 300. This operation creates a new hierarchical relationship between the Hartford data object 306 and the tree by disconnecting it from its subordinate position in relation to the Connecticut data object 304, and establishing a new position subordinate to the another data object, for example, Massachusetts 312. At the end of such a drag-drop interaction, all relevant user access dependencies are automatically updated to correspond to the new situation. For example, whereas a user having access to the Connecticut data object 304 in this scenario would also ordinarily have access to the Hartford data object 306, as implied by the hierarchy. However, after the drag-drop operation reassigns the Hartford data object 306 to a position that is subordinate to Massachusetts 312, users who have access to the Connecticut data object 304 but not the Massachusetts data object 312 no longer have implicit access to the Hartford data object 306, and all permissions within system 100 are automatically updated accordingly.

It will be understood by those having skill in the art that many other types of interaction are possible without departing from the spirit of the invention. For example, interaction with the GUI is possible using various combinations of keystrokes, alternative pointing devices, touch-screens, voice commands and the like, or combinations of these devices.

It is important to note that because a drag-drop operation will change relationships among other data objects within representation 300 as well, a user performing a drag-drop operation may be limited in where they are permitted to "drop" the data object. For instance, a user assigned to the Corporate data object 350 would be permitted to drop the Hartford data object 306 at any point below the top level in the tree. However, a user assigned to the Northeast data object 302 would be permitted to drop the Hartford data object 306 at a point subordinate to the Northeast data object in the tree, but would not be permitted to drop the Hartford data object 306 directly below the Corporate data object 350 and would not be permitted to drop the Hartford data object 306 below the Southeast data object 318 for example. This is because users assigned only to the Northeast data object ordinarily do not have access to modify control information for the Corporate or Southeast data objects.

Optionally, the structure of representation 300 can automatically reorganize upon modification of a data object at an intermediate level within the hierarchy.

Figure 5A:
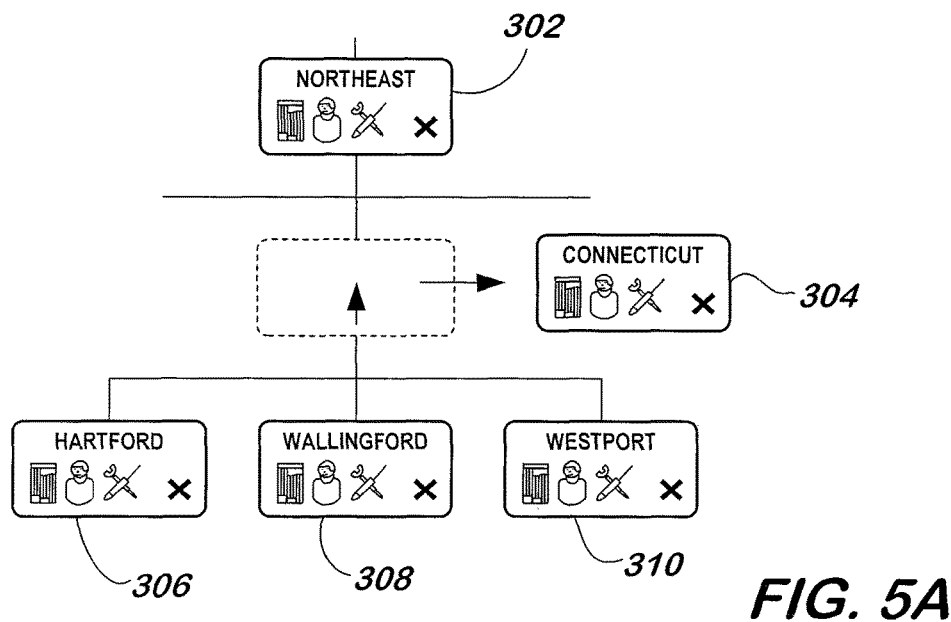
FIGS. 5A and 5B are views illustrating one optional strategy where disconnected data objects on the tree can be automatically reorganized according to aspects of the invention.
Figure 5B:
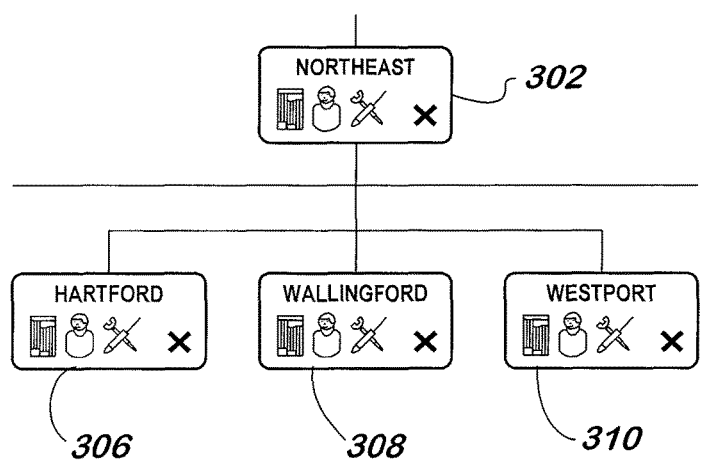

For example, FIGS. 5A and 5B illustrate one optional strategy, where disconnected dependent data objects on the tree can be automatically reorganized to depend from their grandparent data object, or another suitable data object. For example, if the Connecticut data object 304 is moved to depend from the Central data object 320 using a drag-drop or similar operation, the Hartford 306 Wallingford 308 and Westport 310 data objects would no longer be connected to the root data object (i.e. Corporate data object 350). In this case, the Hartford 306 Wallingford 308 and Westport 310 data objects would be updated to depend from their grandparent data object, which in this example is the Northeast data object 302.

Figure 6:
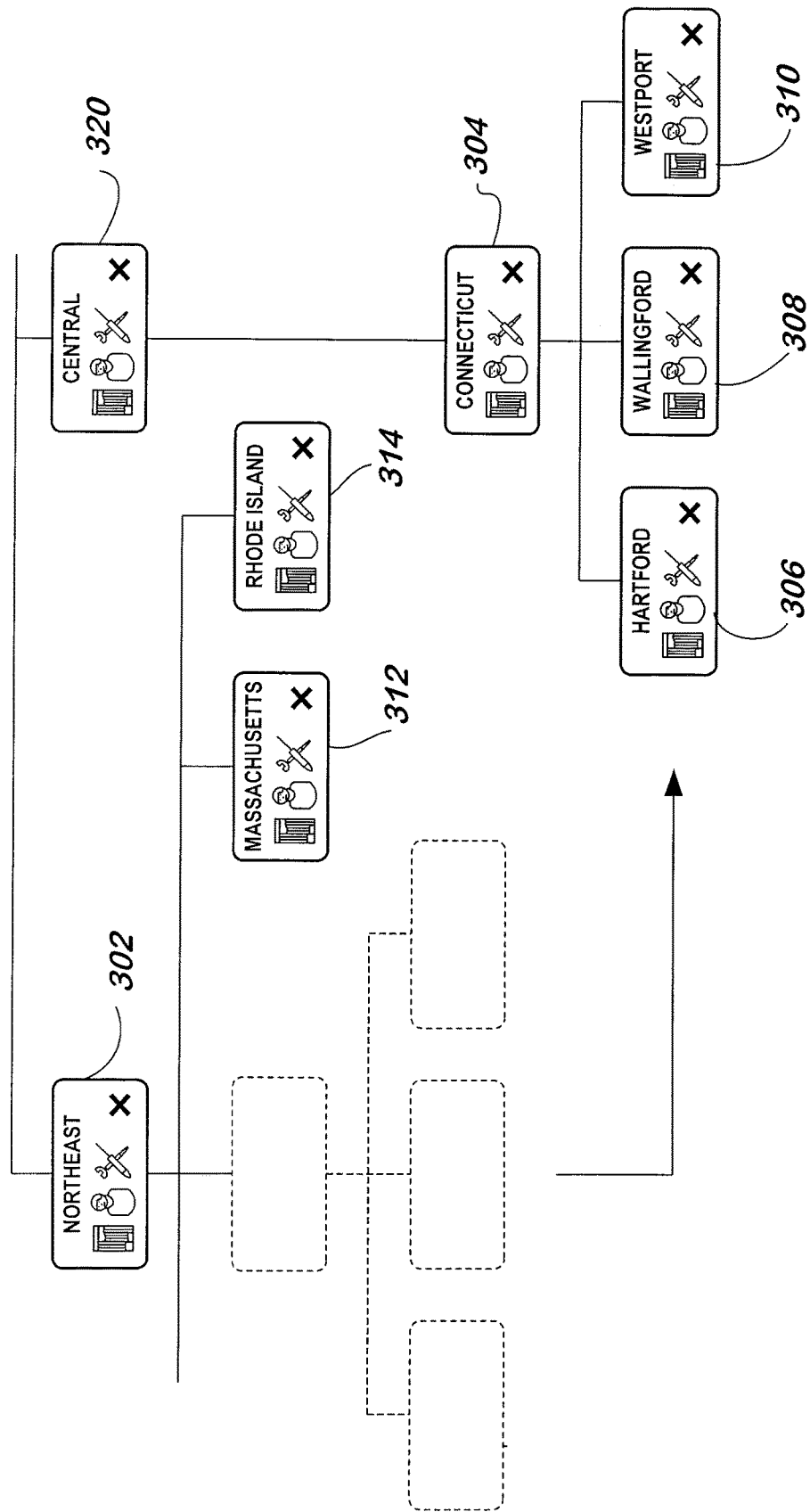
FIG. 6 is a view illustrating another example using another optional strategy where disconnected data objects on the tree can be automatically reorganized according to aspects of the invention.

FIG. 6 illustrates another example using another optional strategy, where the structure of representation 300 the Hartford 306 Wallingford 308 and Westport 310 data objects can remain connected in their dependent relationship with the Connecticut data object after it is moved to depend from the Central data object 320. For Example, if the Connecticut data object 304 is moved from a position subordinate to the Northeast data object 302 to a position subordinate to the Central data object 320, all data objects subordinate to Connecticut can "follow" it to its new data object, i.e., can be modified to have new dependencies. For example, using this strategy, Hartford 306 Wallingford 308 and Westport 310 would be subordinate to the Central data object 320 via the Connecticut data object 304 after the drag-drop operation is completed.

In addition to managing existing relationships among remote subscriber data objects, the GUI enables administrators with appropriate levels of authority to easily add new icons representing additional remote subscriber data objects or displays.

Figure 7:
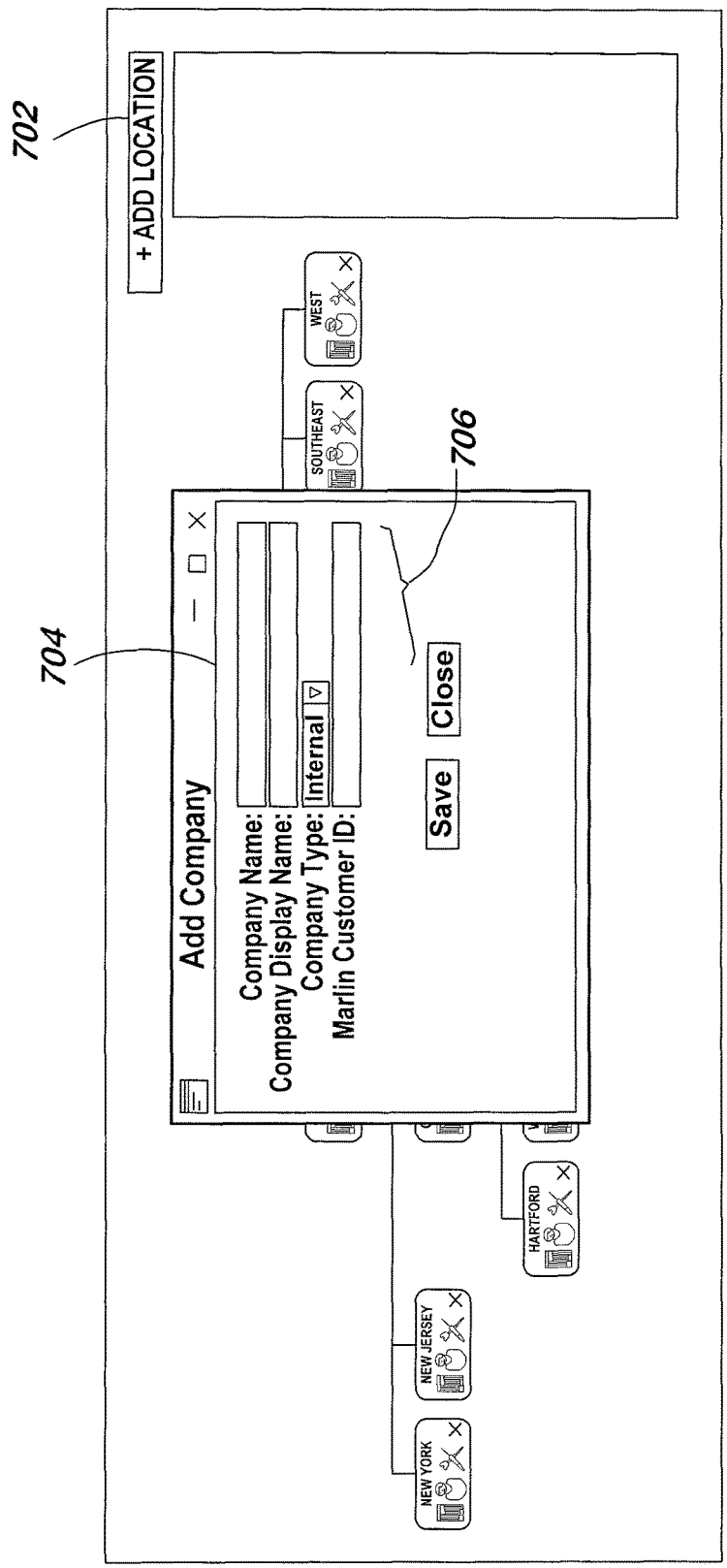
FIG. 7 is a view illustrating an example screen of a GUI according to aspects of the invention.

FIG. 7 illustrates an example screen of GUI 112 (FIG. 1) where an add location control 702 has been selected by a user having an appropriate level of administrative access. An add company dialog 704 is displayed to the user, who can enter appropriate identifying information into supplied fields 706 to create a new data object.

Figure 8:
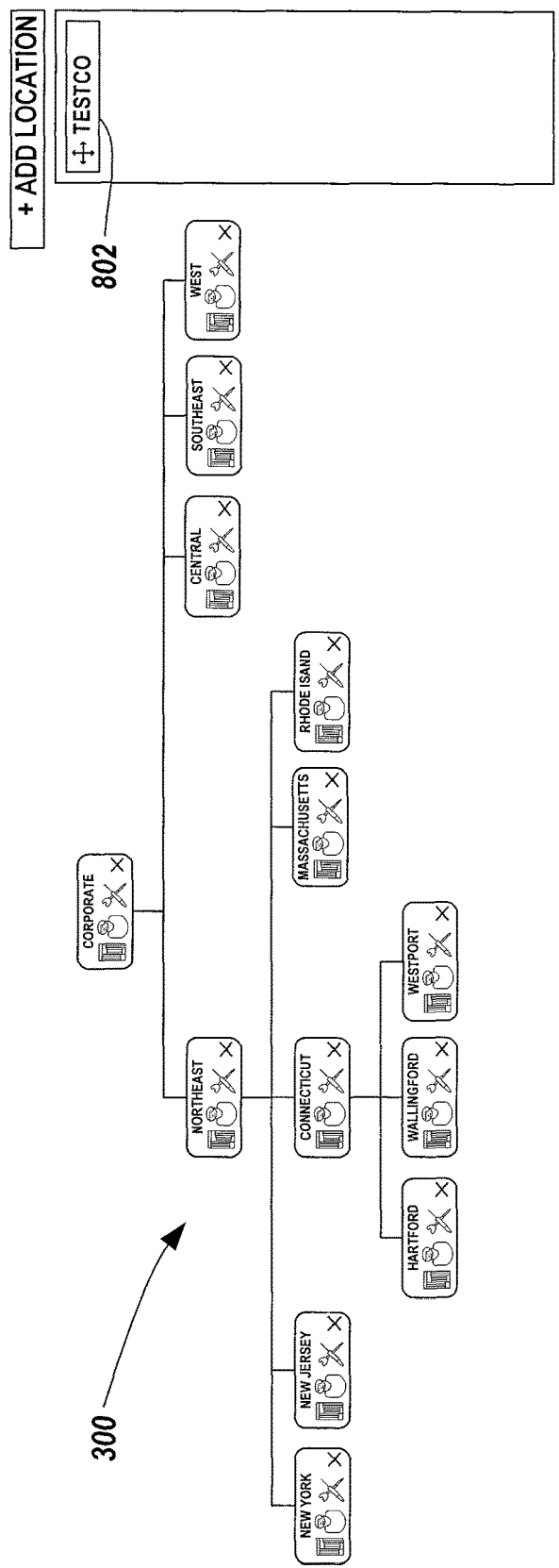
FIG. 8 is a view illustrating an example representation of a new data object which may be created according to aspects of the invention.

FIG. 8 illustrates an example representation of a new data object 802 which may be created using the add company dialog 704 (FIG. 7). New data object 802 may be dragged into a desired position within representation 300 by a user using the drag-drop procedure described with respect to FIG. 4.

Figure 9:
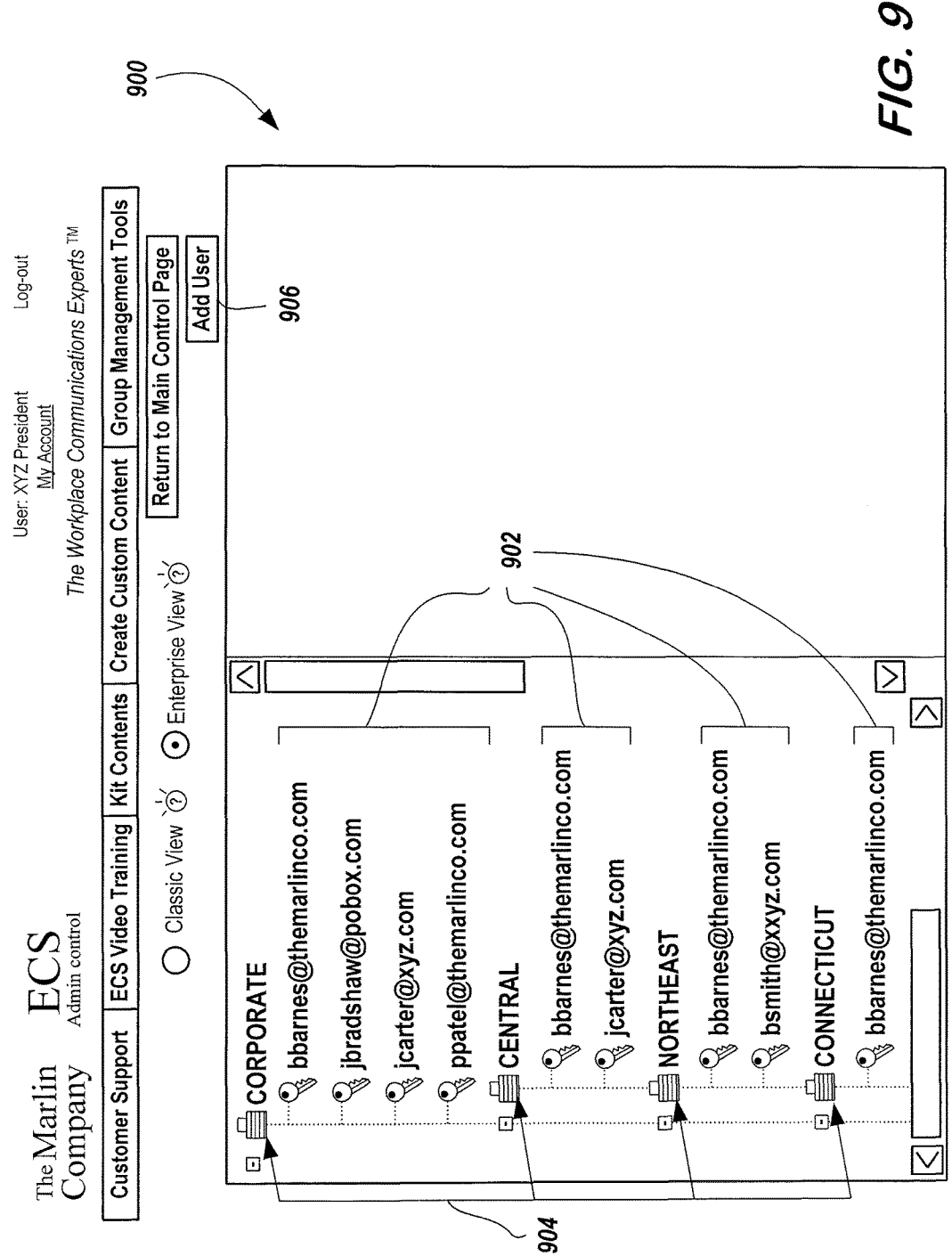
FIG. 9 is a view illustrating an example user selection dialog showing various users assigned to a data object according to aspects of the invention.
Figure 10:
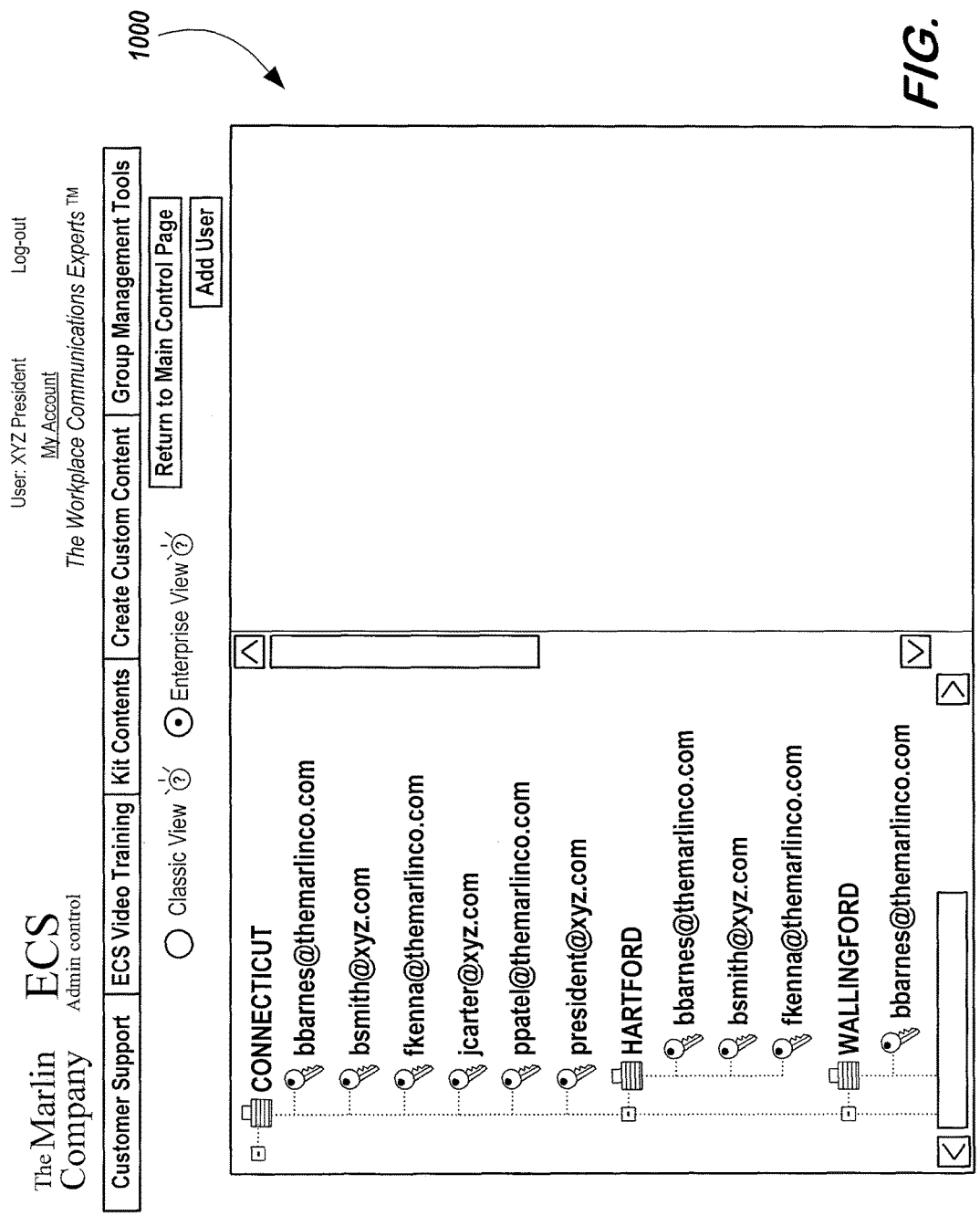
FIG. 10 is a view illustrating an example user selection dialog similar to FIG. 9, but showing only the limited information according to aspects of the invention.

FIG. 9 illustrates an example user selection dialog 900 showing various users assigned to a data object. The example information shown in this figure would be visible to a user assigned to the Corporate data object 350 (FIG. 3). Here, users 902 are listed under the various data objects 904 to which they are assigned. New users may be added using an add user control 906. FIG. 10 illustrates an example user selection dialog 1000 similar to FIG. 9, but showing only the limited information visible to a user assigned only to the Connecticut data object 304 (FIG. 3).

Figure 11:
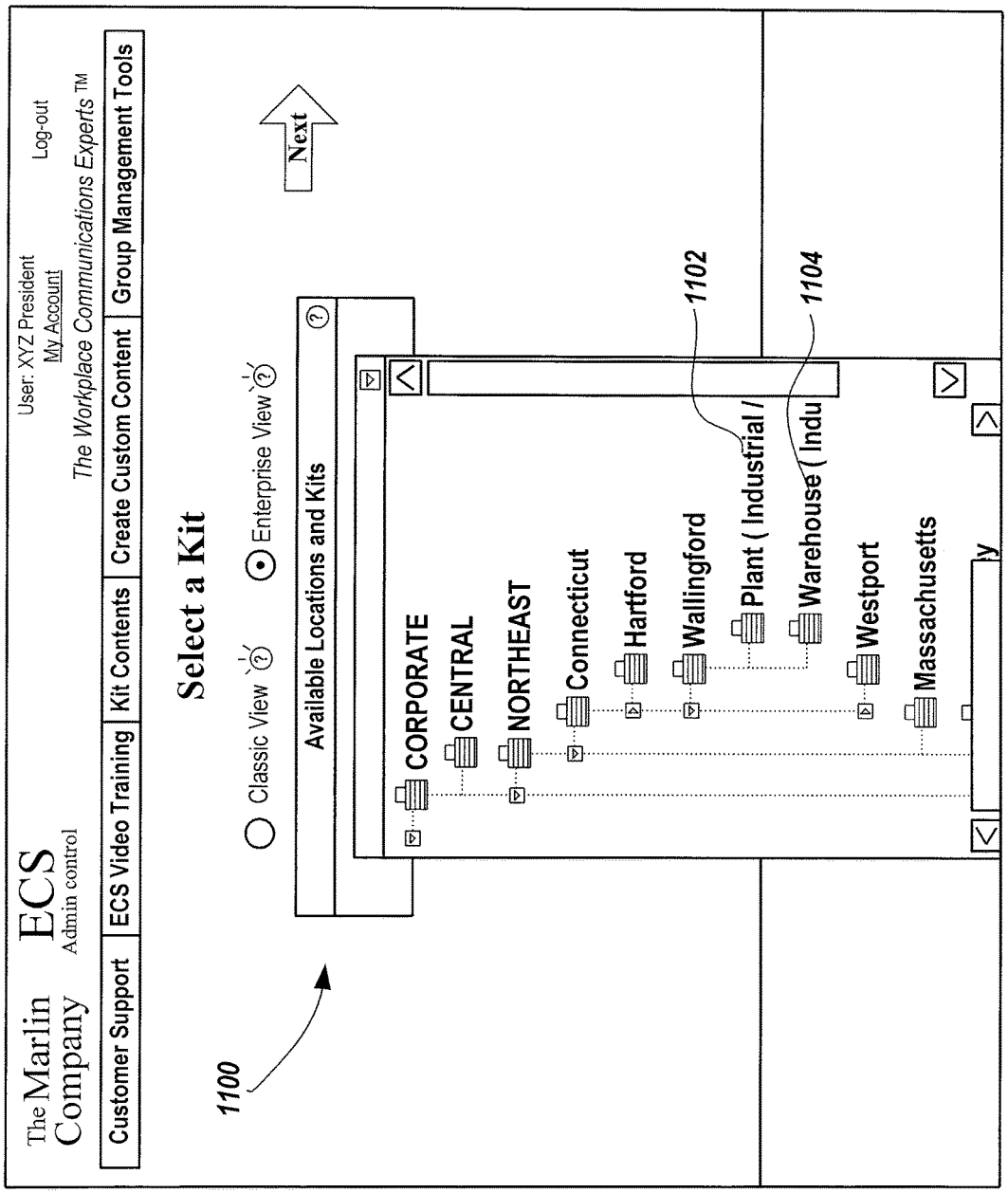
FIG. 11 is a view illustrating an example configuration dialog whereby various arrangements of media data can be assembled, selected, modified, assigned, transferred, or otherwise managed as a "kit" according to aspects of the invention.
Figure 12:
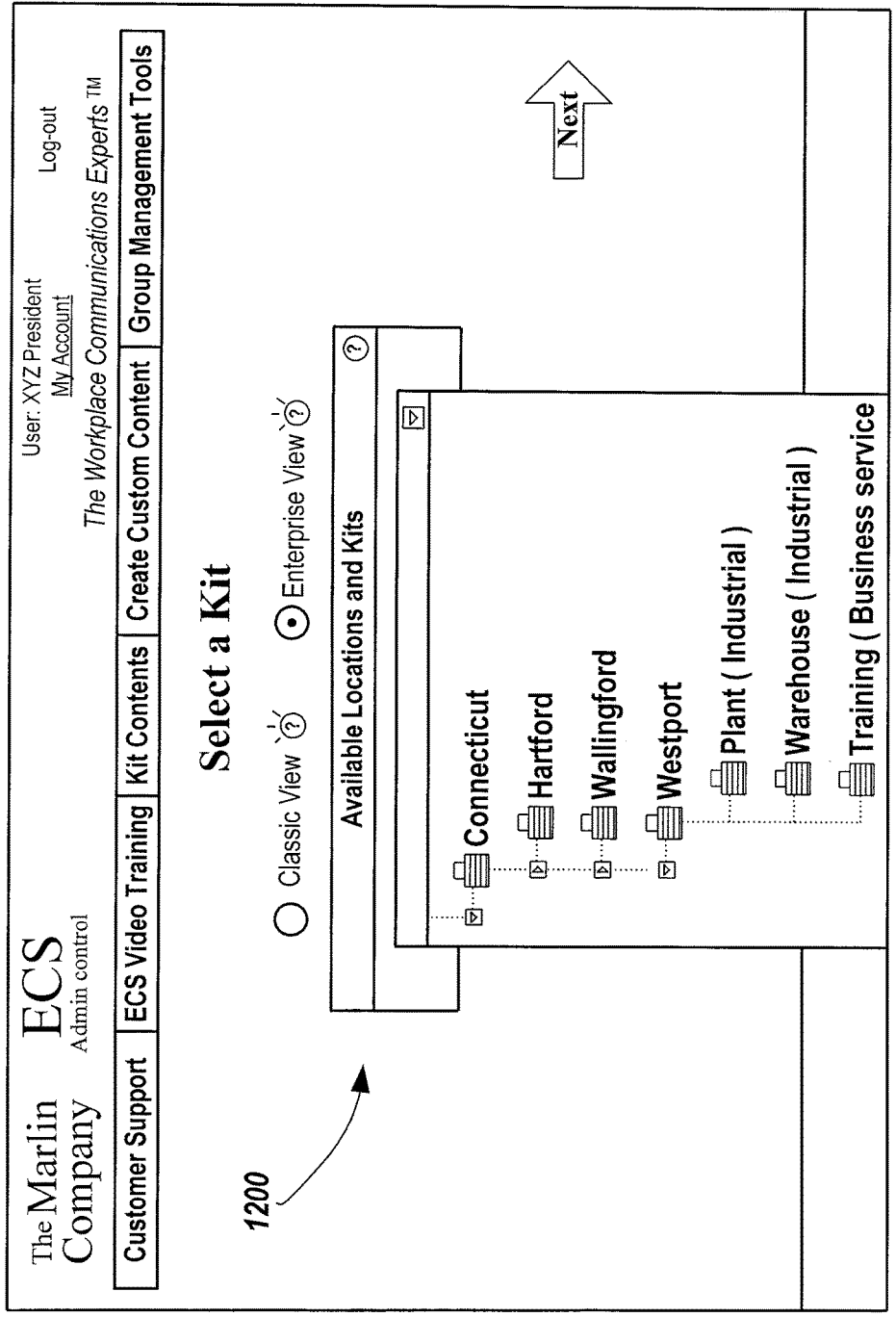
FIG. 12 is a view illustrating another example configuration dialog whereby various arrangements of media content can be assembled, selected, modified, assigned, transferred, or otherwise managed as a "kit" according to aspects of the invention.

FIGS. 11 and 12 illustrate example configuration dialogs 1100 and 1200 whereby various arrangements of content (not shown) from electronic media storage 110 (FIG. 1) can be assembled, selected, modified, assigned, transferred, or otherwise managed as a "kit". FIG. 11 shows the configuration information accessible to users assigned to the root data object Corporate data object 350, while FIG. 12 shows the configuration information accessible to users of the intermediate data object Connecticut data object 304.

Kits can be listed under various terminal data objects shown in dialog 1100. For example, the Wallingford data object has two listed "kits", a plant kit 1102 and a warehouse kit 1104. Each kit represents a collection of media from electronic media storage 110 (FIG. 1) can be assembled, selected, modified, assigned, transferred, or otherwise managed, and which can be shown on displays associated with Wallingford data object 308.

Figure 13:
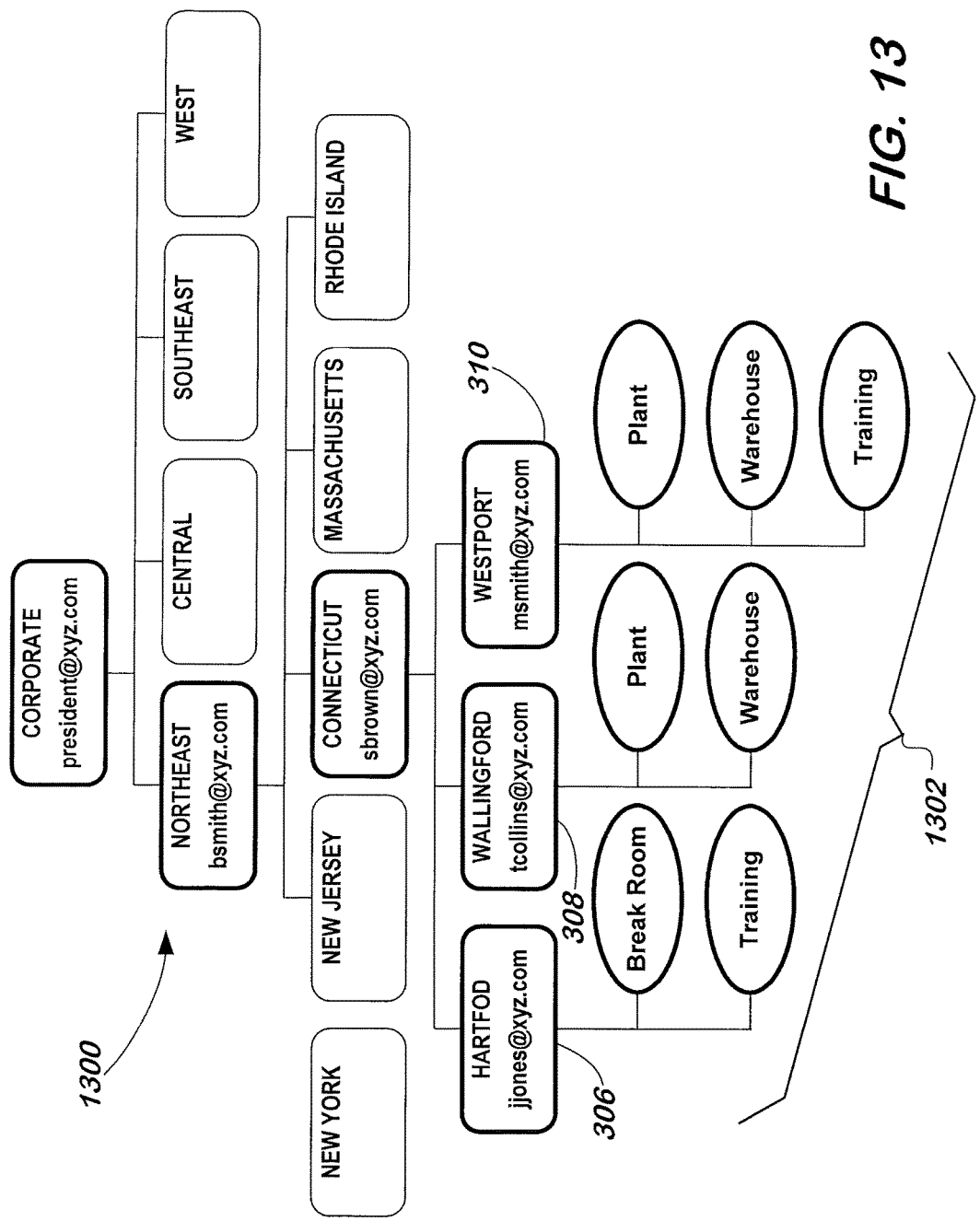
FIG. 13 is a view illustrating another example of a hierarchical graphical representation expressing the administrative relationships among various subscriber locations according to aspects of the invention.

FIG. 13 illustrates another example of a hierarchical graphical representation 1300 expressing the administrative relationships among various users, administrators, and displays. Representation 1300 is similar to representation 300 (FIG. 3) except in that specific displays 1302 are shown in relation to the terminal data object Hartford data object 306, Wallingford data object 308, and Westport data object 310. Organizing representation 1300 in this way can have the advantage of enabling a finer granularity of control over system 100 (FIG. 1) i.e., by providing access to the particulars of individual displays using GUI 112 (FIG. 1).

Figure 14:
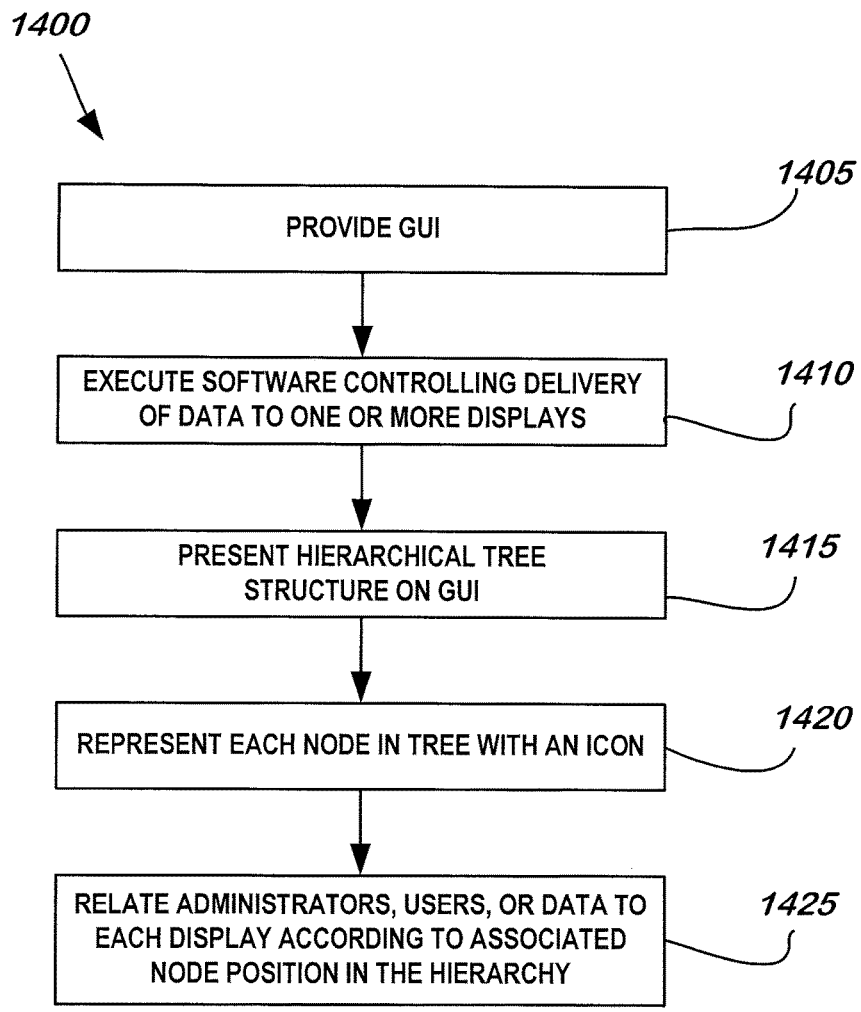
FIG. 14 is a flowchart illustrating a method according to aspects of the invention.

FIG. 14 is a flowchart illustrating a method 1400 of controlling delivery of data to one or more displays over a network, the method comprising:

In a first step 1405, providing a GUI coupled to a computer

In a second step 1410, executing software on the computer controlling delivery of data to the one or more displays;

In a third step 1415, presenting a hierarchical tree structure on the GUI having data objects, each data object reflecting groups of administrators, users, or data for one or more of the displays;

In a fourth step 1420, representing each data object in the hierarchical tree structure by an icon;

In a fifth step 1425, relating administrators, users, or data to each display according to the position of the data objects within the hierarchy.

A GUI can comprise one or more of a computer, a laptop, a smart phone, a touch screen device, or other components of graphical user interfaces known to those having skill in the art.

The data delivered to the displays can comprise electronic media data including audio, video, text, images, animations, web pages, streaming media data, combinations thereof, or other media data as commonly understood in the art.

What is claimed is:

1. A system for controlling delivery of display information to display systems over a network, the system comprising:
    a storage device storing the display information as media data arranged into collections of media content;
    a computer including a processor;
    a graphical user interface (GUI) coupled to the computer, the computer configured to:
    present a hierarchical tree structure including a plurality of data objects represented by icons on the GUI, wherein delivery of the display information to the display systems is controlled via options provided by the data objects;
    assign the display systems to corresponding data objects of the plurality of data objects based on respective geographic locations of the display systems;
    assign users to each of the data objects, wherein assignments of the users are modifiable only by administrators assigned to respective data objects or to data objects at a higher level in the hierarchical tree structure, wherein users assigned to each data object have permission to assign, or modify the display information associated with either that data object or with data objects at a lower level in the hierarchical tree structure;
    assign selected media content from the collections of media content to each of the display systems according to a position of the respective data objects within the hierarchical tree structure and user assignment; and
    deliver the selected media content over the network to each of the display systems based on corresponding assignments of the display systems to the corresponding data objects, wherein at least one icon represents multiple display systems, and the selected media content delivered to each of the multiple display systems is different, the selected media content customized based on activities conducted at respective geographic locations of the multiple display devices, wherein the hierarchical tree structure is modifiable using a drag-drop procedure, and wherein a user performing the drag-drop procedure is limited in a location in the hierarchical tree structure where a data object is permitted to be dropped based at least in part on a position of the proposed drop location in the hierarchical tree structure relative to a highest level data object in the hierarchical tree structure assigned to the user.

2. The system of claim 1, wherein at least one of administrators, users, and the display information are assigned to at least one of the data objects.

3. The system of claim 1, wherein the hierarchical tree structure is modifiable by reassignment of at least one of administrators, users, and the display information, to at least one the data objects.

4. The system of claim 1, wherein the hierarchical tree structure is modifiable by altering a distribution of the display information to at least one other location on the hierarchical tree structure.

5. The system of claim 1, wherein each icon includes buttons that allow access for at least one of viewing, assigning, and modifying users for the display systems associated with the data object represented by the icon, for at least one of viewing, assigning, and modifying the display information for the display systems associated with the data object represented by the icon, and to delete the icon and the data object represented by the icon from the hierarchical tree structure.

6. The system of claim 5, wherein the at least one of viewing, assigning and modifying users for locations associated with the icon or the display information for subscriber display systems associated with the icon is performed using one of a selection window, dialog, and menu.

7. The system of claim 1, wherein the drag-drop procedure is defined by dragging both an icon and all icons lower than the icon in the hierarchical tree structure.

8. The system of claim 1, wherein the drag-drop procedure is defined by dragging an icon, wherein all icons lower in the hierarchical tree structure are caused to be reassigned.

9. The system of claim 1, wherein the display information is modifiable only by administrators or users assigned to at least one of the data objects within the hierarchical tree structure that are superior to the data object associated with the each display system.

10. The system of claim 1, wherein selection of the media content is based on a relevance of the media content to individuals in viewing proximity of the display systems.

11. The system of claim 1, wherein the display systems are distributed among different geographic locations and the selected media content is topically relevant to viewers of the display systems resident in the different geographic locations.

12. The system of claim 1 wherein the activities relate to employee job functions, and customized media content is selected for display on the display devices residing at the geographic locations in which the employee job functions are performed.

13. A method of controlling delivery of display information to display systems over a network, the method comprising:

presenting, via a graphical user interface (GUI) coupled to a computer, a hierarchical tree structure including a plurality of data objects represented by icons on the GUI, wherein delivery of the display information to the display systems is controlled via options provided by the data objects;

assign the display systems to corresponding data objects of the plurality of data objects based on respective geographic locations of the display systems;

assign users to each of the data objects, wherein assignments of the users are modifiable only by administrators assigned to respective data objects or to data objects at a higher level in the hierarchical tree structure, wherein users assigned to each data object have permission to assign, or modify the display information associated with either that data object or with data objects at a lower level in the hierarchical tree structure;

assign selected media content from the collections of media content to each of the display systems according to a position of the respective data objects within the hierarchical tree structure and user assignment; and deliver the selected media content over the network to each of the display systems based on corresponding assignments of the display systems to the corresponding data objects, wherein at least one icon represents multiple display systems, and the selected media content delivered to each of the multiple display systems is different, the selected media content customized based on activities conducted at respective geographic locations of the multiple display devices, wherein the hierarchical tree structure is modifiable using a drag-drop procedure, and wherein a user performing the drag-drop procedure is limited in a location in the hierarchical tree structure where a data object is permitted to be dropped based at least in part on a position of the proposed drop location in the hierarchical tree structure relative to a highest level data object in the hierarchical tree structure assigned to the user.

14. The method of claim 13, wherein the computer comprises at least one of a laptop, a smart phone, and a touch screen device.

15. The method of claim 13, wherein functions of the GUI are accessible to at least one of administrators and users.

16. The method of claim 15, wherein access by an administrator or user of the at least one of the administrators and users to functions of the GUI is limited based upon the data objects to which they are assigned and by the positions of these data objects within the hierarchical tree structure.

17. The method of claim 13, wherein the display information includes audio, video, text, images, animations, web pages, streaming media data and combinations thereof.

18. The method of claim 13, wherein a sequential order and a time limit for the display information to be displayed on the display system to which a user is assigned are settable by an assigned user.

* * * * *